United States Patent [19]

Awamoto et al.

[11] Patent Number: 4,757,392
[45] Date of Patent: Jul. 12, 1988

[54] ERROR COMPENSATION BY A RAMP WAVEFORM HAVING A HIGH SIGNAL-TO-NOISE RATIO

[75] Inventors: Shigeru Awamoto; Tatsushi Bannai, both of Osaka, Japan

[73] Assignee: Matsushita Electric Industrial Co., Ltd., Osaka, Japan

[21] Appl. No.: 884,698

[22] Filed: Jul. 11, 1986

[30] Foreign Application Priority Data

Jul. 12, 1985 [JP] Japan .................... 60-154648
Jul. 12, 1985 [JP] Japan .................... 60-154649

[51] Int. Cl.⁴ ............................ H04N 5/782
[52] U.S. Cl. ............................ 358/340; 358/166; 358/167; 360/33.1; 360/22; 360/24; 360/31; 360/27
[58] Field of Search ........... 358/336, 340, 166, 167; 360/33.1, 22, 24, 31, 27

[56] References Cited

U.S. PATENT DOCUMENTS 4,415,938 11/1983 Heitmann .................... 360/53
4,458,271 7/1984 Horstmann .
4,459,613 7/1984 Faroudja .
4,489,354 12/1984 Dann .................... 360/64

FOREIGN PATENT DOCUMENTS

0171759 2/1986 European Pat. Off. .
2908321 9/1980 Fed. Rep. of Germany .

Primary Examiner—Robert L. Richardson
Attorney, Agent, or Firm—Lowe, Price, LeBlanc, Becker & Shur

[57] ABSTRACT

A signal processing circuit for a video recording and reproducing apparatus comprises a ramp inserting circuit for inserting a ramp waveform at periodic intervals into a video signal during recording. The ramp waveform varies linearly as a function of time from the minimum to the maximum level of the video signal. On playback, the inserted ramp is periodically detected from a reproduced video signal by a ramp detector. The waveform of the detected ramp is corrected to improve its signal-to-noise ratio by an averaging circuit and applied to a transfer circuit having a transfer function describing the relationship between the original ramp waveform and the corrected ramp waveform. The waveform of the reproduced video signal is transformed according to the transfer function.

37 Claims, 7 Drawing Sheets

ERROR COMPENSATION BY A RAMP WAVEFORM HAVING A HIGH SIGNAL-TO-NOISE RATIO

BACKGROUND OF THE INVENTION

The present invention relates generally to error compensation particularly advantageous to high quality signal processing apparatus such as video recording and/or reproducing apparatus.

Waveform distortion resulting from the inherent nonlinear characteristics of analog electronic circuitry is of primary concern to the design of high quality signal processing systems. In video recording, the waveform distortion is accounted for not only by the nonlinear characteristics of frequency modulators and demodulators, but by DC drift and clamping voltage deviation which combine to produce a waveform different from the original. Such distortion problem becomes serious when it is desired to record a signal of high information density such as broadcast satellite television signals. It has been proposed to record such a high density video signal by splitting it into two channel components at alternate horizontal lines and expanding them on time scale twice as longer than the duration of the original in an attempt to relax the high quality requirements. If the separated video channels are affected differently from each other on passing through respective analog electronic circuits, horizontal lines are likely to appear to flicker on the video screen.

Co-pending U.S. patent application Ser. No. 763,604, filed Aug. 8, 1985 by T. Bannai et al, discloses a signal processing circuit for high quality video signal recording and reproduction. This circuit comprises a reference inserting circuit for inserting a ramp waveform at periodic intervals into an analog information signal during a recording mode. The amplitude of the ramp varies linearly as a function of time so that the instantaneous amplitudes of the information signal correspond to those of the ramp and can therefore be represented by the length of time from the start of the ramp. On playback, the inserted ramp is detected by a reference detector from the information signal. A transfer circuit is provided having a transfer function describing the relationship between the original reference waveform and the detected reference waveform which has been affected by errors present in the apparatus in the same manner as the waveform of the information signal. The transfer circuit transforms the waveform of the information signal according to the transfer function to compensate for such errors.

However, if the detected ramp is severely contaminated with random noise, or distorted differently from the manner the information signal is distorted, the error compensation is likely to result in the generation of an information signal which is not replica of the original signal.

SUMMARY OF THE INVENTION

Accordingly, an object of the present invention is to provide a signal processing circuit which compensates for errors introduced to an information signal by a transfer circuit using an inserted reference waveform having a high signal-to-noise ratio. The invention is particularly suitable for recording systems and communication systems.

In a broader aspect of the invention, a signal processing circuit of the present invention comprises a reference inserting circuit for inserting a reference waveform at periodic intervals into an information signal, or specifically a video signal. The reference waveform has instantaneous amplitudes which vary with time in a range between the minimum and maximum amplitudes of the information signal so that the instantaneous amplitudes of the information signal can be translated to a value proportional to the length of time from the start of each of the periodic reference waveforms. A reference detector circuit detects the inserted reference waveform from the signal as the latter is reproduced from a recording medium or received through a transmission medium. The detected reference waveform undergoes a waveform correction process by which its signal-to-noise ratio is significantly improved. A transfer circuit is provided having a transfer function describing the relationship between the original reference waveform and the corrected reference waveform which still retains the waveform affected by errors present in the apparatus in the same way as the information signal is affected. The transfer circuit transforms the waveform of the information signal according to the transfer function. Preferably, the transfer function is updated at periodic intervals.

In a specific aspect, the invention provides a video recording and reproducing apparatus. The apparatus comprises a channel separation circuit for separating a video signal into first and second channel components so that the first channel component includes odd-numbered lines and the second channel component includes even-numbered lines. During recording modes, a reference inserting circuit generates a reference waveform, inserts it into the vertical blanking period of each channel and applies the channel components to a recording medium through first and second transducer circuits respectively. The reference waveform varies in amplitude all the way from the white level to the black level of a television signal. During playback modes, a first reference detector is coupled to the first transducer circuit for detecting the reference waveform from the first channel component and a second reference detector is coupled to the second transducer circuit for detecting the reference waveform from the second channel component. The reference waveforms detected from the first and second channel components are corrected by first and second waveform correctors which are essentially averaging circuits to improve their signal-to-noise ratios. The waveform of the first channel component is transformed to an error-free waveform by a first transfer circuit according to a first transfer function describing the relationship between the original reference waveform and the reference waveform corrected by the first waveform corrector. The waveform of the second channel component is also transformed to an error-free waveform by a second transfer circuit according to a second transfer function describing the relationship between the original reference waveform and the reference waveform corrected by the second waveform corrector. The transformed first and second channel components are recombined in a channel recombining circuit to generate a video output which is a replica of the original video signal.

BRIEF DESCRIPTION OF THE DRAWINGS

The present invention will be described in further detail with reference to the accompanying drawings, in which.

DETAILED DESCRIPTION

Figure 1:
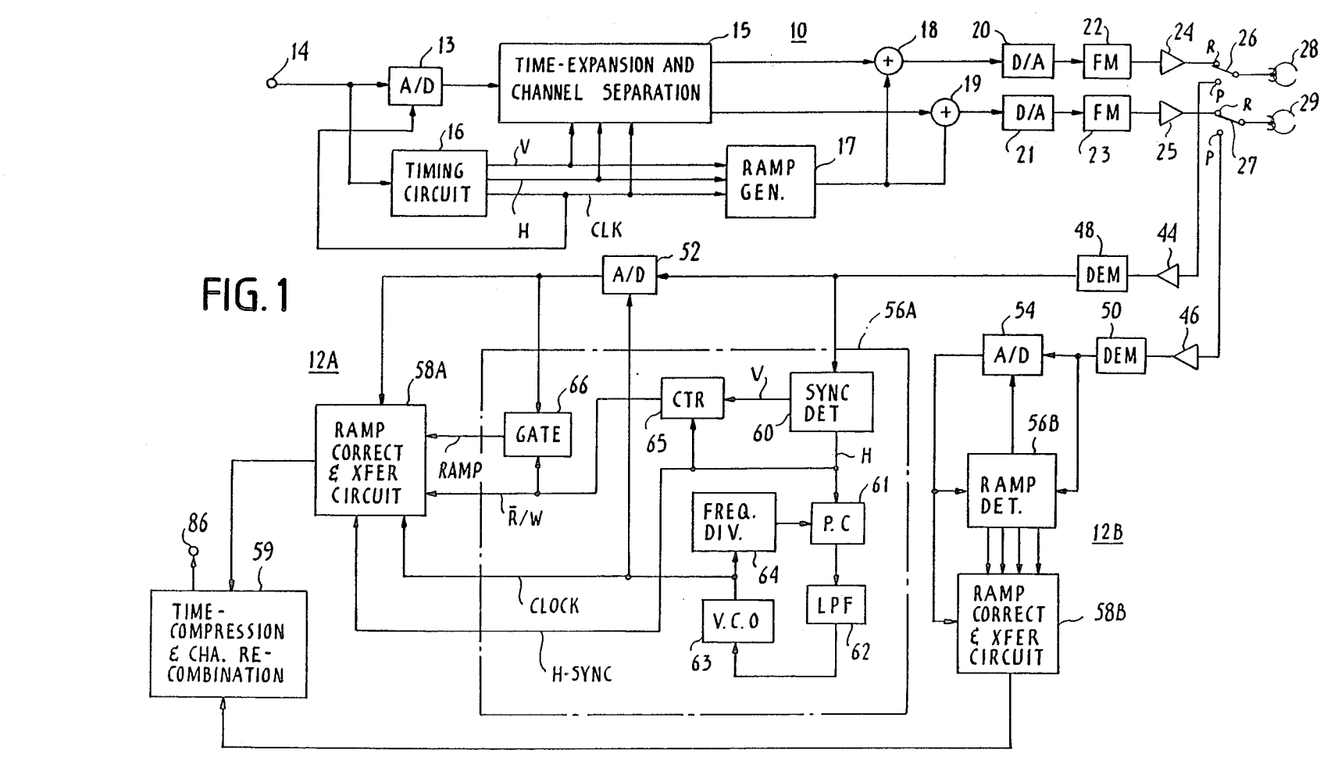
FIG. 1 is a schematic block diagram of a preferred embodiment of a video recording and/or reproducing apparatus of the present invention.

FIG. 1 shows a preferred embodiment of a video tape recording and/or reproducing apparatus in accordance with the present invention. The apparatus generally comprises a two-channel recording circuit 10, a first channel playback circuit 12A and a second channel playback circuit 12B. The two-channel recording circuit 10 comprises an analog-to-digital converter 13 connected to an input terminal 14 to which a high-quality television signal is applied. Such high-quality television signals are transmitted in a frequency modulation format from a broadcast satellite and frequency demodulated upon reception before being applied to the input terminal 14. The input video signal is converted to digital form and applied to a time-expansion and channel separation circuit 15 which expands the time base of the input signal by twice as much and splits it into two channel components in a manner as will be detailed below.

The analog input signal is also applied to a timing circuit 16. This timing circuit detects horizontal line sync and vertical blanking pulses and generates clock pulses at a frequency which is an integral multiple of the line frequency and supplies the timing signals including the detected line sync and blanking pulse to time-expansion and channel separation circuit 15 and to a digital ramp generator 17. The clock pulse is further applied to analog-to-digital converter 13 to synchronize its timing with the time base. Ramp generator 17 includes a counter that initiates counting line sync pulses in response to a blanking pulse from the timing circuit 16 to detect a predetermined line sync within the vertical blanking and further includes a read only memory storing digital ramp data and an address counter which addresses the memory in response to the clock pulse to generate a digital ramp varying stepwisely from the white level to black level of a television picture.

The digital ramp is applied to adders 18 and 19 and inserted to the two-channel video components in the position of the predetermined line sync of each vertical blanking interval. The outputs of adders 18 and 19 are converted to analog form by digital-to-analog converters 20, 21, frequency modulated by modulators 22, 23, amplified at 24, 25 and fed to video transducer heads 28, 29. Video heads 28 and 29 are mounted on the circumference of a rotary drum of any of a well known video tape loading mechanism such that they follow parallel tracks skewed relative to the length of video tape. The separation of the input video signal into two channels is to reduces signal density on the recording medium and relaxes its quality requirements and tape operating mechanisms.

In playback, the recorded time-expanded two-channel video components are detected by video heads 28 and 29 and applied through switches 26, 27 and amplifiers 44, 46 to frequency demodulators 48, 50 to recover the original two-channel analog video signals, which are converted to digital form by analog-to-digital converters 52 and 54.

The first channel playback circuit 12A generally includes a ramp detector 56A and a ramp correction and transfer circuit 58A, and similarly, the second channel playback circuit 12B includes a ramp detector 56B and a ramp correction and transfer circuit 58B which are indentical in construction to those of the first channel playback circuit. The outputs of transfer circuits 58A and 58B are applied to a time-compression and channel recombination circuit 59 which operates in a manner inverse to that of the time-expansion and channel separation circuit 15 to supply an output which appears at a terminal 86.

For purposes of simplicity, the first-channel ramp detector 56A is shown in detail in FIG. 1. Ramp detector 56A comprises a sync detector 60 which is connected to the demodulator 48 to detect line sync pulses and vertical blanking pulses. A phase-locked loop is provided including a phase comparator 61, a low-pass filter 62, a voltage-controlled oscillator 63 and a frequency divider 64. Phase comparator 61 provides phase comparison between the detected line sync pulse and the output of frequency divider 64. Voltage-controlled oscillator 63 generates a clock pulse at the sampling frequency of the associated analog-to-digital converter 52. Frequency divider 64 divides the sampling frequency to a value corresponding to the line frequency of the first-channel video signal to be compared with the detected line sync by the phase comparator 60. The output of VCO 63 is applied to the analog-to-digital converter 52 as a sampling pulse to cause it to digitize the reproduced first-channel video component and to the ramp correction and transfer circuit 58A as a clock signal.

Ramp detector 56A further includes a counter 65 and a gate 66 which is connected to the output of analog-to-digital converter 52. Counter 65 is enabled by sync detector 60 when it detects a vertical blanking pulse to initiate counting the line sync pulses present in the detected blanking interval to generate a gating pulse, or a read/write enable pulse when the count reaches a predetermined number corresponding to that line sync position in which the reference digital ramp is inserted. This read/write enable pulse is applied to the gate 66 to cause it to extract the inserted digital ramp from the first-channel digitized video component appearing at the output of analog-to-digital converter 52.

Figure 2:
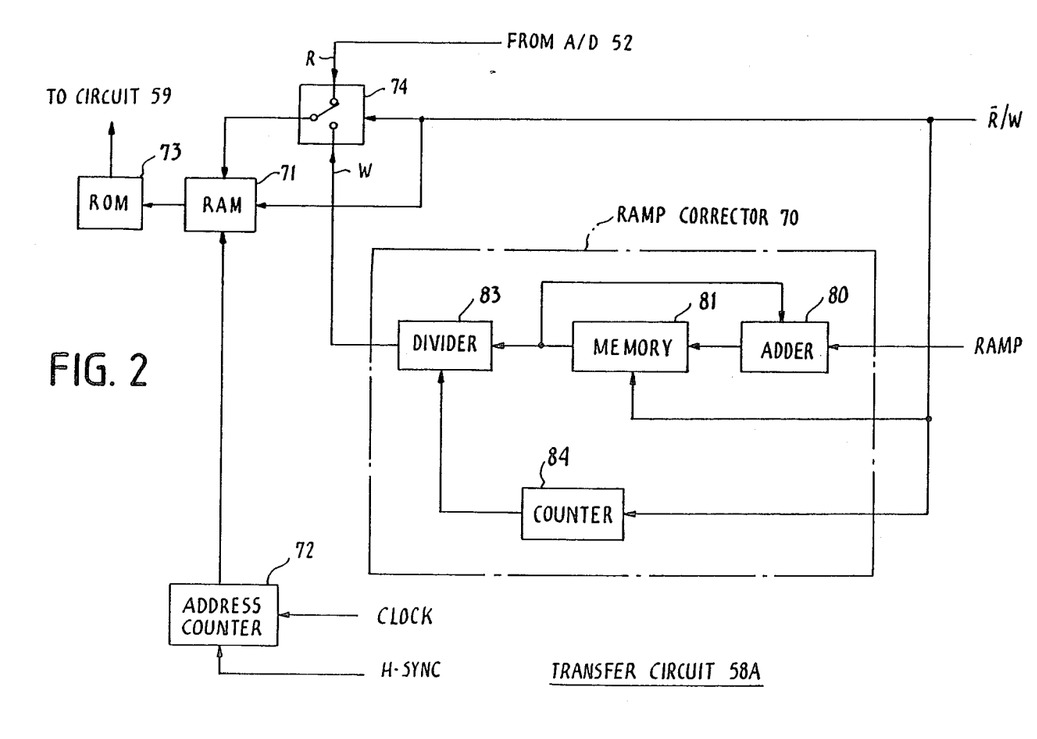
FIG. 2 is a block diagram of a ramp correction and transfer circuit of FIG. 1 according to a first embodiment of the present invention.

A first embodiment of the first-channel ramp correction and transfer circuit 58A is shown in FIG. 2. This circuit comprises a ramp corrector 70, a random access memory 71, an address counter 72 which generates incremental address codes as a function of time, a read-only memory 73 and an electronic switch 74. As will be described in detail later, random-access memory 71 has memory cells into which the incremental address codes are stored as a function of the instantaneous amplitudes of the detected ramp so that the stored address data is updated at each vertical blanking pulse. The stored address data is thereafter repeatedly read out of memory 71 as a function of the instantaneous amplitudes of the digitized first-channel video component supplied from analog-to-digital converter 52. Read-only memory 73 stores the amplitude data of a reference ramp waveform identical to that inserted to the video signal, the amplitude data being read out of ROM 73 as a function of the address code supplied from RAM 71. RAM 71 and ROM 73 constitute a transfer circuit having a transfer function describing the relationship between the amplitude data supplied to the address input of RAM 71 from the analog-to-digital converter 52 and the amplitude data read out of ROM 73 so that any waveform distortion which arises in the video signal is removed in the process of read operations.

As will be detailed later, the ramp corrector 70 provides correction of the waveform of the detected ramp before it is applied to the RAM 71 to remove any ramp waveform distortion which would otherwise cause undesirable effects on the amplitude correction process by memories 71 and 73. Electronic switch 74 has a "write" terminal through which the output of ramp corrector 70 is applied to the address input of RAM 71 when the read/write output of ramp detector 56A is at logical "1" and a "read" terminal through which digital video samples from the output of analog-to-digital converter 52 are supplied to the address input of RAM 71 when the read/write output of ramp detector 56A is at logical "0". Address counter 72 counts clock pulses from ramp detector 56A in response to each line sync pulse to generate incremental address codes representing the cell locations of RAM 71 which are repeatedly addressed by the digital video sample.

When a digital ramp is detected by the ramp detector 56A, the read/write enable output of ramp detector 56A switches to logical "1" which causes switch 74 to couple the output of ramp corrector 70 to the address input of RAM 71 and causes RAM 71 to be switched to a write mode. Thus, the incremental address codes developed by address counter 72 are stored sequentially into memory cells of RAM 71 as a function of the incremental amplitude of the reproduced ramp which may have been nonlinearly distorted in the same manner as the amplitude of the video signal is distorted. During the interval between successive vertical blanking pulses, the read/write output of ramp detector 56A switches to logical "0" causing the output of analog-to-digital converter 52 to be applied to the address input of RAM 71 and switching RAM 71 to read mode. Thus, the stored incremental address codes are read out of RAM 71 as a function of the digital amplitude of the first-channel video samples and supplied to the address input of ROM 73 to read the amplitude data of the reference ramp. The process is repeated so that RAM 71 is updated at each vertical blanking pulse to alter the transfer function with the time varying distortion which equally affects the video signal and the inserted ramp waveform.

Figure 3:
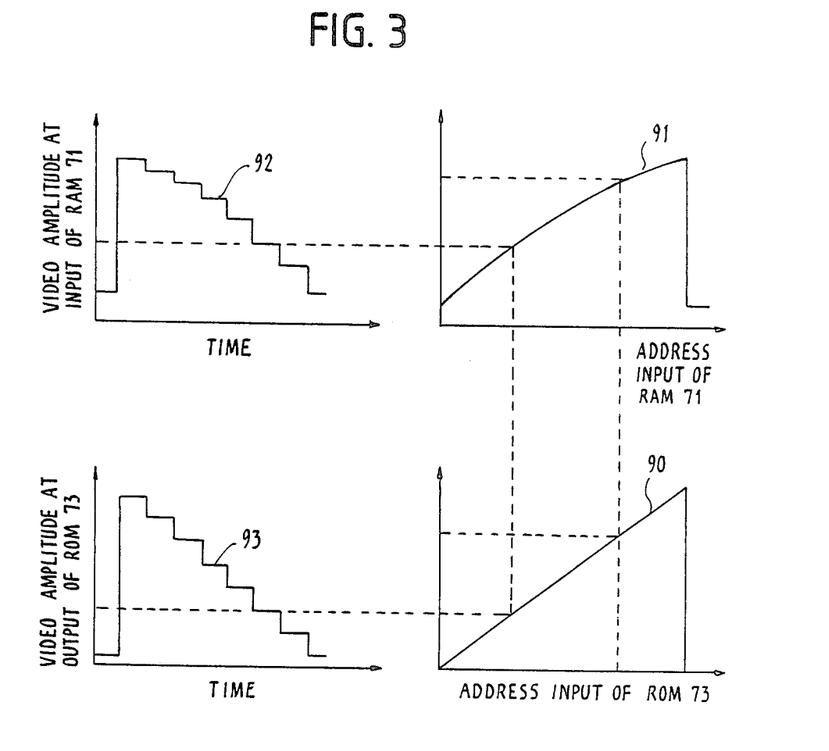
FIG. 3 is a waveform diagram useful for describing the operation of the circuit of FIG. 2.

In more detail, the amplitude data stored in ROM 73 describes a ramp waveform 90, as shown in FIG. 3, which is identical to the reference ramp inserted to the video signal by ramp generator 17. Therefore, the waveform stored in ROM 73 is linear as a function of its address input which is incremental with time, while the amplitude data applied to the address input of RAM 71 may be distorted as indicated by a ramp waveform 91 which is nonlinear as a function of the incremental address output of address counter 72. At the start of each field scan, the incremental address codes are updated new address codes as a function of the amplitude of a detected ramp. During the subsequent field scan, digital video samples are supplied from analog-to-digital converter 62 to the address input of RAM 71 and the incremental address codes stored therein are read out of the memory 71 into ROM 73. If the video signal is distorted as indicated by a waveform 92, the amplitude data read out of ROM 73 produces a video signal having a corrected amplitude as indicated by a waveform 93.

Due to the level correction mentioned above, the reproduced video waveforms of both channels are made substantially equal to each other, thus eliminating "line flicker" which would otherwise occur on the video screen due to the otherwise waveform imbalance between the two channel signals.

The error compensation is succesfully achieved so long as the detected ramp signal is not severely contaminated with noise or affected differently from the video signal. If so, the ramp signal would cease to be a reference waveform, resulting in a poor picture quality. This can be avoided by correcting the waveform of the detected ramp by the ramp corrector 70. Ramp corrector 70 is essentially an averaging circuit which comprises an integration circuit formed by a digital adder 80, a memory 81, a divider 83 and a counter 84. Counter 84 counts the logical "1" of the read/write enable output of ramp detector 56A and supplies an output to the divider 83 when the count reaches "N". A digital ramp signal provided by the ramp detector 56A is supplied to a first input terminal of the adder 80 which sums it with a signal applied to the second input terminal thereof from the output of memory 81. When the ramp signal on a first arrival appears at the output of adder 80, the read/write enable output of ramp detector 56A is at logical "1" and the ramp signal is stored into memory 81 and appears at the second input of adder 80. When the ramp signal of a second arrival is applied to adder 80, it is summed with the first ramp signal and the summed ramp signal is stored into memory 81 and appears at the second input of adder 80. The process is repeated until successive ramp signals are integrated "N" times and the integrated waveform of the ramp signals is stored in the memory 81, whereupon the counter 84 provides an output to the divider 83 to cause it divide or scale the integrated ramp waveform by a dividing factor "N" to generate a digital output which is representative of an average value of the successive ramp signals. Experiments show that by averaging out a series of eight ramps the signal-to-noise ratio is improved by 9 dB.

Figure 4:
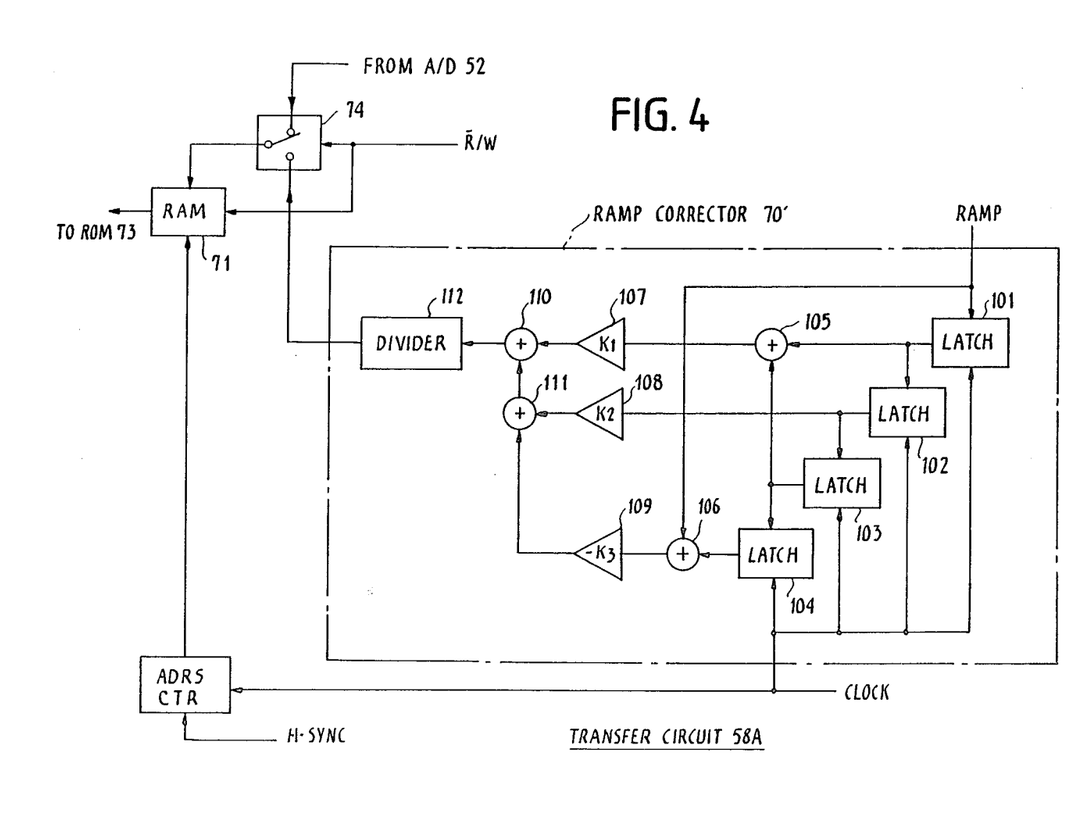
FIG. 4 is a block diagram of the ramp correction and transfer circuit according to a second embodiment of the invention.

FIG. 4 is an illustration of a modified embodiment of the ramp corrector 70. In this modification, the ramp corrector designated 70' is essentially a weighted-function averaging circuit which provides a waveform smoothing effect on each digital ramp signal, so that the address codes stored in RAM 71 can be updated at shorter intervals than the intervals at which the RAM is updated in the embodiment of FIG. 2. The ramp corrector of FIG. 4 comprises latches 101 through 104 which are connected successively so that the output of each latch is connected to the input of the next latch and are responsive to the clock output of ramp detector 56A. A digital sample of a ramp detected by ramp 10 detector 56A is supplied to the latch 101 and stored therein in response to a clock pulse. First, second, third and fourth ramp-signal samples are stored into latches 104, 103, 102 and 101, respectively, upon arrival of the fourth ramp-signal sample. In response to a fifth ramp-signal sample, the fourth ramp-signal sample is supplied from latch 101 to an adder 105 and summed with the second ramp-signal sample from latch 103 and the first ramp-signal sample is supplied from latch 104 to an adder 106 and summed with the fifth ramp-signal sample. Simultaneously, the output of adder 105 is applied to a multiplier 107 so that the fourth ramp-signal sample is multiplied in amplitude by a weighting factor $K_1$ and fed to an adder 107. The output of latch 102, which stores the third ramp-signal sample, is presented to a multiplier 108 where it is multiplied in amplitude by a factor $K_2$ and fed to an adder 111 and the output of adder 106 is multiplied by a multiplier 109 by a factor of $-K_3$ and fed to adder 111, the output of adder 111 being summed with the output of multiplier 107 by adder 110 and fed to a divider 112 where it is divided in amplitude by a factor $K_4$. The output of divider 112 appears in response to each clock pulse so that for a given input digital sample $x_n$ there is an output digital sample $X_n$ which is represented by an equation $(1/K_4)\{K_2 x_n + K_1(x_{n+1} + x_{n-1}) + (-K_3)(x_{n+2} + x_{n-2})\}$. By appropriately selecting the multiplying factors, the equation describes a normal distribution for a give set of inputs to the latches 101 to 104. Typically, the multiplying factors $K_1$, $K_2$, $K_3$ are 12, 17 and 3, respectively, and the dividing factor $K_4$ is 35 which equals the total sum of the products of multiplying factors and the number of latches which are combined by adders 105 and 106, i.e, $K_4 = 2K_1 + K_2 + (-2K_3)$. According to experiments, an improvement of about 4 dB can be achieved by the weighted-function averaging.

Figure 5:
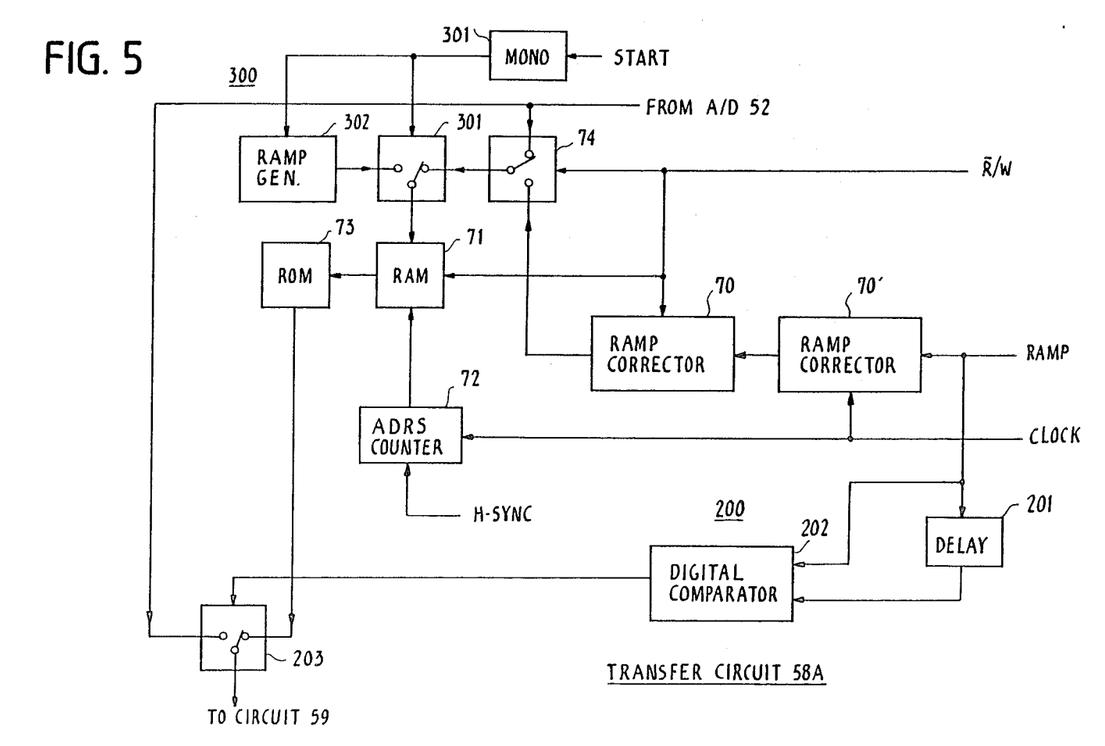
FIG. 5 is a block diagram of the ramp correction and transfer circuit modified according to the present invention.

A further signal-to-noise improvement can be achieved by combining the long-term averaging ramp corrector of FIG. 2 and the short-term averaging ramp corrector of FIG. 4 as shown in FIG. 5. In FIG. 5, ramp corrector 70' is connected to the ramp output of detector 56A to effect the short-term, weighted-function averaging on digital ramp-signal samples and supplies its output to the long-term averaging corrector 70 whose output is coupled to the write terminal of the read/write switch 74.

Figure 6:
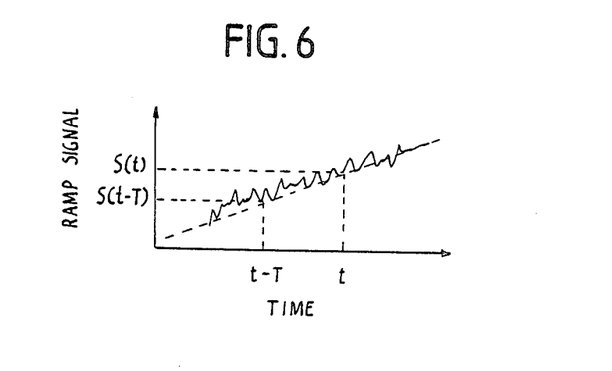
FIG. 6 is a waveform diagram associated with the embodiment of FIG. 5.

The ramp signal is likely to be severely distorted or completely lost during high-speed scan modes or frame-freeze modes. In such instances, it is desirable to discard the ramp signal and allows the video signal to be supplied to the time compression and channel recombination circuit 59 without undergoing amplitude correction. This is accomplished by a verification circuit 200 shown in FIG. 5. This circuit includes a delay element 201 for introducing a time delay to the ramp signal and a digital comparator 202 having a first input terminal receptive of the ramp signal and a second input terminal connected to the output of delay circuit 201. The output of comparator 202 is connected to a control input of a switch 203 which selectively couples the outputs of analog-to-digital converter 52 and read-only memory 73 to the time compression and channel recombination circuit 59. When the delay circuit 201 introduces a time delay T to a ramp signal, the digital comparator 202 detects the difference in amplitude between ramp-signal samples S(t) and S(t−T), FIG. 6, and determines if the difference is beyond the range between a lower limit m and an upper limit n, typically, the values m and n being −2 and 4, respectively, with the interval T being 1 clock interval. Being proportional to the gradient of a ramp, the detected difference lies outside of the range if the ramp signal is severely destroyed. When this occurs, digital comparator 202 generates an output signal which causes switch 203 to apply the output of analog-to-digital converter 52 to the time compression and channel recombination circuit 59 instead of the output of read-only memory 73.

The embodiment of FIG. 5 further includes an initial memory control circuit 300 for generating a initial ramp signal in digital form. This ramp signal is used as an address input of the RAM 71 for a brief initial period of operation of the apparatus since there is no output signal from ramp corrector 70 for an interval of several frames following the start of the operation. A monostable multivibrator 301 responds to the start of operation of the apparatus and causes a ramp generator 302 to generate a ramp signal identical to the ramp inserted to the video signal. A switch 303 is activated momentarily in respne to the output of monostable 301 to apply the ramp signal to the address input of RAM 71. RAM 71 is switched to a write mode in response to a logical "1" output on read/write output of ramp detector 56A and stores the incremental address codes supplied from address counter 72. Switch 301 is then restored to normal position, coupling the output of analog-to-digital converter 52 to the address input of RAM 71 to repeatedly read the initial address codes until the ramp corrector 70 generates an output signal.

Figure 7:
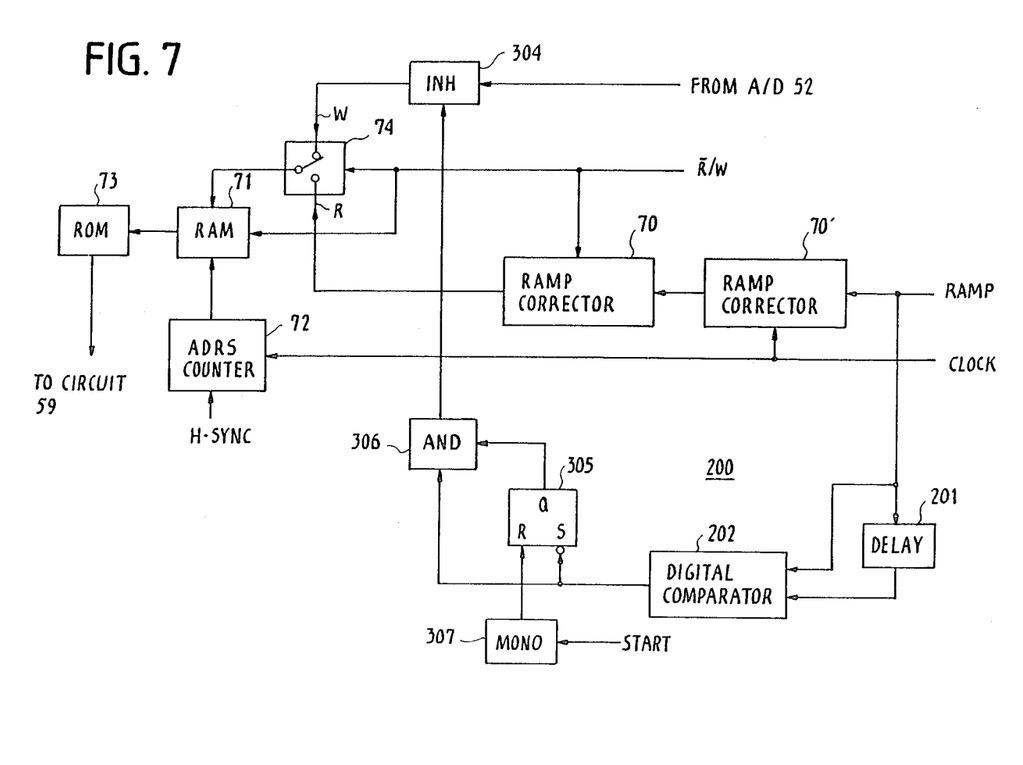
FIG. 7 is a block diagram of a modified form of the ramp correction and transfer circuit of FIG. 5.

In an alternative embodiment shown in FIG. 7, the output of analog-to-digital converter 52 is supplied through an inhibit gate 304 to the write terminal of switch 74. The output of digital comparator 202 is connected to an inverted set input of a flip-flop 304 and to a first input of an AND gate 306 which takes a second input from the Q output of flip-flop 305. A monostable multivibrator 307 responds to a signal which occurs in response to the start of operation of the apparatus to generate a reset pulse, which is applied to the rest input of flip-flop 305. The output of AND gate 306 is connected to the control terminal of inhibit gate 304. Flip-flop 305 is switched to a low output state when the apparatus is started. If a noiseless ramp signal is detected, the digital comparator 202 provides a logical "0" output which causes the flip-flop 305 to switch to a high output state. Simultaneously, the incremental address data from address counter 72 is written into RAM 71 as a function of the instantaneous amplitudes of the ramp waveform corrected by the ramp corrector 70 in a manner identical to that described previously. Subsequently, the output of analog-to-digital converter 52 is supplied through inhibit gate 304 and switch 74 to RAM 71 to read the stored address code therefrom into ROM 73. If a noise-affected ramp signal is detected, the digital comparator 202 generates a logical "1" output which causes the AND gate 306 to activate the inhibit gate 304 to prevent the address data stored in RAM 71 from being read out in response to the output of analog-to-digital converter 52 which occurs subsequent to the occurrence of the noise-affected ramp signal. As a result, the address code stored in response to a given occurrence of a noiseless ramp signal is prevented from being updated with data which would otherwise be in error due to the noise-affected ramp signal and the same data is repeatedly utilized for addressing the ROM 73 until the occurrence of a subsequent noise-free ramp signal.

Figure 8:
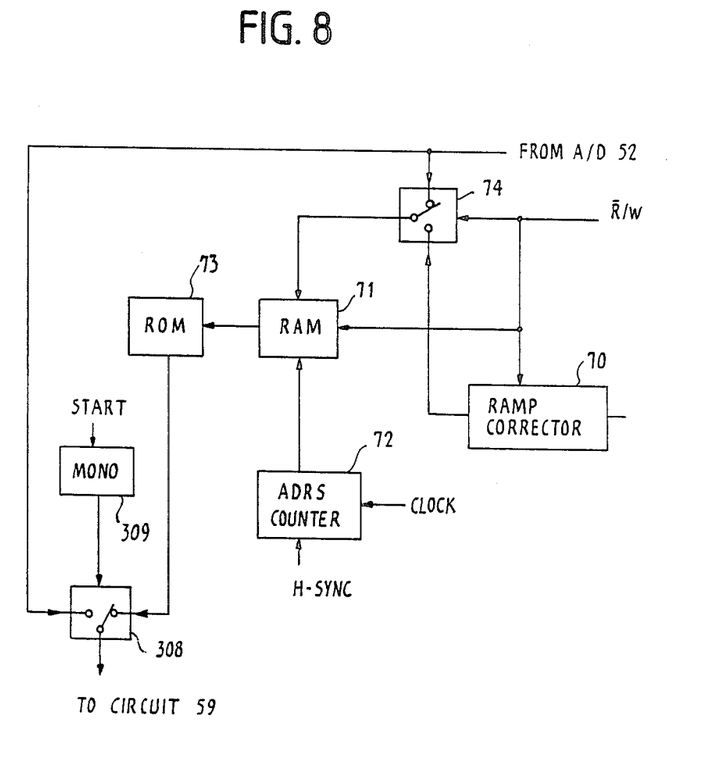
FIG. 8 is a block diagram of a further modification of the ramp correction and transfer circuit of FIG. 5.

In a further alternative embodiment shown in FIG. 8, the output of analog-to-digital converter 52 is directly applied to the time compression and channel recombination circuit 59 via a switch 308 in response to an output pulse from a monostable multivibrator 309 which responds to the start of operation of the apparatus, whereby the video signals can be utilized instead of the output of ROM 73 until the ramp corrector 70 generates an output signal. This improves the picture quality of the apparatus for a brief initial period of operation.

What is claimed is:

1. A signal processing apparatus for processing an information signal, comprising:
   reference inserting means for generating a reference waveform and inserting it at periodic intervals into said signal, the instantaneous value of said reference waveform varying as a function of time in a range in which the amplitude of said information signal is variable;
   reference detecting means for detecting the inserted reference waveform from the information signal;
   means for correcting the reference waveform detected by said reference detecting means by improving the signal-to-noise ratio thereof; and
   transfer means having a transfer function describing the relationship between said reference waveform inserted by said inserting means and the corrected reference waveform for transforming the waveform of said information signal to a distortion-free waveform according to said transfer function.

2. A signal processing circuit as claimed in claim 1, wherein said correcting means comprises an integration circuit for integrating a predetermined number of the detected reference waveforms which occur in sequence and a divider for attenuating the amplitude of the output of the integration circuit by a factor corresponding to said predetermined number.

3. A signal processing circuit as claimed in claim 2, wherein said correcting means comprises means a smoothing circuit.

4. A signal processing circuit as claimed in claim 3, wherein said smoothing circuit comprises:
   a plurality of latches for successively storing the instantaneous amplitudes of the detected reference waveform;
   a plurality of multipliers for scaling the outputs of said latches by multiplying factors of different values;
   means for summing the outputs of said multipliers; and
   a divider for scaling the output of said summing means by a dividing factor determined by said multiplying factors.

5. A signal processing circuit as claimed in claim 4, wherein said dividing factor is a function of a total sum of said multiplying factors.

6. A signal processing circuit as claimed in claim 1, wherein said correcting means comprises a short-term averaging circuit for averaging instantaneous amplitudes of the detected reference waveform and a long-term averaging circuit connected to the output of said short-term averaging circuit for averaging a plurality of the detected reference waveforms averaged by said short-term averaging circuit.

7. A signal processing circuit as claimed in claim 6, wherein said short-term averaging circuit comprises:
   a plurality of latches for successively storing the instantaneous amplitudes of the detected reference waveform;
   a plurality of multipliers for scaling the outputs of said latches by multiplying factors of different values;
   means for summing the outputs of said multipliers; and
   a first divider for scaling the output of said summing means by a dividing factor determined by said multiplying factors, and wherein said long-term averaging circuit comprises:
   an integration circuit for integrating the output of said summing means which is generated in response to a predetermined number of said detected reference waveforms, and;
   a second divider for scaling the amplitude of the output of the integration circuit by a dividing factor corresponding to said predetermined number.

8. A signal processing circuit as claimed in claim 1, wherein said transfer means comprises:
   a first memory;
   a second memory storing a reference waveform identical to the reference waveform inserted by said inserting means;
   means for generating incremental address data as a function of time; and
   means for storing the address data into said first memory as a function of instantaneous amplitudes of the detected reference waveform of a given occurrence so that the stored address data is updated in response to a subsequent occurrence of the detected reference waveform and repeatedly reading the stored address data out of the first memory as a function of instantaneous amplitudes of said information signal and supplying it to an address input of said second memory.

9. A signal processing circuit as claimed in claim 8, wherein said reference waveform inserted to the video signal is a ramp waveform, further comprising:
   delay means for introducing a time delay to the reference waveform detected by said detecting means; and
   means for detecting the difference between the output of said delay means and the reference waveform detected by said detecting means and preventing the address data stored in said first memory from being updated in response to the detected reference waveform of the subsequent occurrence when the detected difference is outside of a predetermined range to allow the address data stored in response to the detected reference waveform of the given occurrence to be read out of said first memory in response to the information signal which occurs subsequent to the reference waveform of said subsequent occurrence.

10. A signal processing circuit as claimed in claim 1, wherein said transfer means comprises:
   a first memory;
   a second memory storing a reference waveform identical to the reference waveform inserted by said inserting means;
   means for generating incremental address data as a function of time;
   means for generating a second reference waveform in response to the start of operation of said signal processing circuit;
   means for storing said incremental address data into said first memory as a function of instantaneous amplitudes of said second reference waveform and repeatedly reading the stored address data out of said first memory as a function instantaneous amplitudes of said information signal for a predetermined interval and supplying the read address data to an address input of said second memory; and means for storing the address data into said first memory as a function of instantaneous amplitudes of the detected reference waveform immediately following the end of said predetermined interval and repeatedly reading the stored address data out of the first memory as a function of instantaneous amplitudes of said information signal and supplying the read address data to an address input of said second memory.

11. A signal processing circuit as claimed in claim 10, wherein said second reference waveform is identical to the reference waveform inserted to said information signal.

12. A video recording and reproducing apparatus, comprising:

reference inserting means operable during recording mode of the apparatus for generating a reference waveform and inserting it into a vertical blanking period of a video signal and applying the video signal to a recording medium through transducer means, said reference waveform varying in a range from white level to black level of said video signal;

reference detecting means coupled to said transducer means for detecting the reference waveform from the video signal reproduced by the transducer means during playback mode of the apparatus, the detected reference waveform being affected by errors which may be present in the apparatus;

means for correcting the detected reference waveform by improving the signal-to-noise ratio thereof; and transfer means having a transfer function describing the relationship between said reference waveform inserted by said inserting means and the corrected reference waveform for transforming the waveform of said reproduced video signal according to said transfer function.

13. A video recording and reproducing apparatus as claimed in claim 12, wherein said correcting means comprises an integration circuit for integrating a predetermined number of the detected reference waveforms which occur in sequence and a divider for scaling the output of the integration circuit according to a dividing factor corresponding to said predetermined number.

14. A video recording and reproducing apparatus as claimed in claim 12, wherein said correcting means comprises a smoothing circuit.

15. A video recording and reproducing apparatus as claimed in claim 14, wherein said smoothing circuit comprises:

a plurality of latches for successively storing the instantaneous amplitudes of the detected reference waveform;

a plurality of multipliers for scaling the outputs of said latches according to multiplying factors of different values;

means for summing the outputs of said multipliers; and a divider for scaling the output of said summing means according to a dividing factor determined by said multiplying factors.

16. A video recording and reproducing apparatus as claimed in claim 15, wherein said dividing factor is a function of a total sum of said multiplying factors.

17. A video recording and reproducing apparatus as claimed in claim 12, wherein said correcting means comprises a short-term averaging circuit for averaging instantaneous amplitudes of the detected reference waveform and a long-term averaging circuit connected to the output of said short-term averaging circuit for averaging a plurality of the detected reference waveforms averaged by said short-term averaging circuit.

18. A video recording and reproducing apparatus as claimed in claim 17, wherein said short-term averaging circuit comprises:

a plurality of latches for successively storing the instantaneous amplitudes of the detected reference waveform;

a plurality of multipliers for scaling the outputs of said latches according to multiplying factors of different values; and means for summing the outputs of said multipliers;

a divider for scaling the output of said summing means according to a dividing factor determined by said multiplying factors, and wherein said long-term averaging circuit comprises:

an integration circuit for integrating the output of said summing means which is generated in response to a predetermined number of said detected reference waveforms, and;

a second divider for scaling the output of the integration circuit according to a dividing factor corresponding to said predetermined number.

19. A video recording and reproducing apparatus as claimed in claim 12, wherein said transfer means comprises:

a first memory;

a second memory storing a reference waveform identical to the reference waveform inserted by said inserting means;

means for generating incremental address data as a function of time; and means for storing the address data into said first memory as a function of instantaneous amplitudes of the detected reference waveform of a given occurrence so that the stored address data is updated in response to the detected reference waveform of a subsequent occurrence and repeatedly reading the stored address data out of the first memory as a function of instantaneous amplitudes of said video signal and applying the read address data to an address input of said second memory.

20. A video recording and reproducing apparatus as claimed in claim 12, wherein said transfer means comprises:

a first memory;

a second memory storing a reference waveform identical to the reference waveform inserted by said inserting means;

means for generating incremental address data as a function of time;

means for generating a second, initial reference waveform in response to the start of operation of said video recording and reproducing apparatus;

means for storing said incremental address data into said first memory as a function of the instantaneous amplitudes of said second reference waveform and repeatedly reading the stored address data out of said first memory as a function of instantaneous amplitudes of said video signal for a predetermined interval and applying the read address data to an address input of said second memory; and means for storing the incremental address data into said first memory as a function of instantaneous amplitudes of the detected reference waveform immediately following the end of said predetermined interval and repeatedly reading the stored address data out of the first memory as a function of the instantaneous amplitudes of said video signal and applying the read address data to an address input of said second memory.

21. A video recording and reproducing apparatus as claimed in claim 18, wherein said second reference, waveform is identical to the reference waveform inserted to said video signal.

22. A video recording and reproducing apparatus as claimed in claim 12, wherein the output of said transfer means is applied to a utilization circuit and wherein said reference waveform inserted to the video signal is a ramp waveform, further comprising:
 delay means for introducing a time delay to the reference waveform detected by said detecting means; and
 means for detecting the difference between the output of said delay means and the reference waveform detected by said detecting means and applying the reproduced video signal to said utilization circuit instead of the output of said transfer means when the detected difference is outside of a predetermined range.

23. A video recording and reproducing apparatus as claimed in claim 19, wherein the output of said transfer means is applied to a utilization circuit and wherein said reference waveform inserted to the video signal is a ramp waveform, further comprising:
 delay means for introducing a time delay to the reference waveform detected by said detecting means; and
 means for detecting the difference between the output of said delay means and the reference waveform detected by said detecting means and preventing the address data stored in said first memory from being updated in response to the detected reference waveform of the subsequent occurrence when the detected difference is outside of a predetermined range to thereby allow the address data stored into said first memory in response to the detected reference waveform of the given occurrence to be read therefrom in response to the video signal which occurs subsequent to the reference waveform of said subsequent occurrence.

24. A video recording and reproducing apparatus as claimed in claim 12, wherein the output of said transfer means is applied to a utilization circuit, further comprising means responsive to the start of operation of said apparatus for applying the reproduced video signal to said utilization circuit for a predetermined period of time instead of the output of said transfer means.

25. A video recording and reproducing apparatus, comprising:
 channel separating means for separating a video signal into a first channel component having odd-numbered lines and a second channel component having even-numbered lines;
 reference inserting means operable during recording mode of the apparatus for generating a reference waveform and inserting it into a vertical blanking period of each of said first and second channel components and applying said components to a recording medium through first and second transducer means respectively, said reference waveform varying in a range from white level to black level;
 first reference detecting means coupled to said first transducer means for detecting the reference waveform from the first channel component reproduced by the first transducer means during playback mode of the apparatus, the detected reference waveform being affected by errors which may be present in the apparatus;
 second reference detecting means coupled to said second transducer means for detecting the reference waveform from the second channel component reproduced by the second transducer means during playback mode of the apparatus, the detected reference waveform being affected by errors which may be present in the apparatus;
 first correcting means for correcting the reference waveform detected by said first reference detecting means by improving the signal-to-noise ratio thereof;
 second correcting means for correcting the reference waveform detected by said second reference detecting means by improving the signal-to-noise ratio thereof;
 first transfer means having a first transfer function describing the relationship between said reference waveform inserted by said inserting means and the reference waveform corrected by said first correcting means for transforming the waveform of said reproduced first channel component according to said first transfer function; and
 second transfer means having a second transfer function describing the relationship between said reference waveform inserted by said inserting means and the reference waveform corrected by said second correcting means for transforming the waveform of said reproduced second channel component according to said second transfer function; and
 channel recombining means for recombining output signals from said first and second transfer means and generating a signal which is a replica of said video signal.

26. A video recording and reproducing apparatus as claimed in claim 25, wherein said first correcting means comprises:
 a first integration circuit for integrating a first predetermined number of the reference waveforms which are detected by the first detecting means in sequence; and
 a first divider for scaling the output of the first integration circuit according to a dividing factor corresponding to said first predetermined number, and wherein said second correcting means comprises:
 a second integration circuit for integrating a second predetermined number of the reference waveforms which are detected by the second detecting means in sequence; and
 a second divider for scaling the output of the second integration circuit according to a dividing factor corresponding to said second predetermined number.

27. A video recording and reproducing apparatus as claimed in claim 25, wherein each of said first and second correcting means comprises means a smoothing circuit.

28. A video recording and reproducing apparatus as claimed in claim 27, wherein said smoothing circuit comprises:
- a plurality of latches for successively storing the instantaneous amplitudes of the detected reference waveform;
- a plurality of multipliers for scaling the outputs of said latches according to multiplying factors of different values;
- means of summing the outputs of said multipliers; and
- a divider for scaling the output of said summing means according to a dividing factor determined by said multiplying factors.

29. A video recording and reproducing apparatus as claimed in claim 28, wherein said dividing factor is a function of a total sum of said multiplying factors.

30. A video recording and reproducing apparatus as claimed in claim 25, wherein said first correcting means comprises:
- a first short-term averaging circuit for averaging instantaneous amplitudes of the reference waveform detected by said first detecting means; and
- a first long-term averaging circuit connected to the output of said short-term averaging circuit for averaging a plurality of the reference waveforms averaged by said first short-term averaging circuit, and wherein said second correcting means comprises:
- a second short-term averaging circuit for averaging instantaneous amplitudes of the reference waveform detected by said second detecting means; and
- a second long-term averaging circuit connected to the output of said short-term averaging circuit for averaging a plurality of the reference waveforms averaged by said second short-term averaging circuit.

31. A video recording and reproducing apparatus as claimed in claim 30, wherein each of said first and second short-term averaging circuit comprises:
- a plurality of latches for successively storing the instantaneous amplitudes of the detected reference waveform;
- a plurality of multipliers for scaling the outputs of said latches according to multiplying factors of different values; and
- means for summing the outputs of said multipliers; and
- a first divider for scaling the output of said summing means according to a dividing factor determined by said multiplying factors, and wherein said long-term averaging circuit comprises:
- an integration circuit for integrating the output of said summing means which is generated in response to a predetermined number of said detected reference waveforms, and;
- a second divider for scaling the output of the integration circuit according to a dividing factor corresponding to said predetermined number.

32. A video recording and reproducing apparatus as claimed in claim 25, wherein said first transfer means comprises:
- a first memory;
- a second memory storing a reference waveform identical to the reference waveform inserted by said inserting means;
- means for generating first incremental address data as a function of time; and
- means for storing the first address data into said first memory as a function of instantaneous amplitudes of the reference waveform of a given occurrence detected by said first detecting means so that the stored first incremental address data is updated in response to a subsequent occurrence of the reference waveform detected by said first detecting means and repeatedly reading the first incremental address data out of the first memory as a function of instantaneous amplitudes of the reproduced first channel component and applying the read address data to an address input of said second memory to read the stored reference waveform therefrom into said channel recombination circuit means, and wherein said second transfer means comprises:
- a third memory;
- a fourth memory storing a reference waveform identical to the reference waveform inserted by said inserting means;
- means for generating second incremental address data as a function of time; and
- means for storing the address data into said third memory as a function of instantaneous amplitudes of the reference waveform of a given occurrence detected by said second detecting means so that the stored second incremental address data is updated in response to a subsequent occurrence of the reference waveform detected by said second detecting means and repeatedly reading the stored second incremental address data out of the third memory as a function of instantaneous amplitudes of the reproduced second channel component and applying the read address data to an address input of said fourth memory to read the stored reference waveform therefrom into said channel recombination means.

33. A video recording and reproducing apparatus as claimed in claim 32, wherein said reference waveform inserted to the first and second channel components is a ramp waveform, further comprising:
- first delay means for introducing a time delay to the reference waveform detected by said first detecting means;
- first means for detecting the difference between the output of said first delay means and the reference waveform detected by said first detecting means and preventing the address data stored in said first memory from being updated in response to the detected reference waveform of the subsequent occurrence when the detected difference is outside of a predetermined range to thereby allow the address data stored into said first memory in response to the detected reference waveform of the given occurrence to be read therefrom in response to the first channel component which occurs subsequent to the reference waveform of said subsequent occurrence;
- second delay means for introducing a time delay to the reference waveform detected by said second detecting means; and
- second means for detecting the difference between the output of said second delay means and the reference waveform detected by said second detecting means and preventing the address data stored in said third memory from being updated in response to the reference waveform of a subsequent occurrence detected by said second detecting means when the detected difference is outside of a predetermined range to thereby allow the address data stored into the third memory in response to the reference waveform of said given occurrence to be read therefrom in response to the second channel component which occurs subsequent to the reference waveform of said subsequent occurrence.

34. A video recording and reproducing apparatus as claimed in claim 30, further comprising:

means for generating an initial reference waveform in response to the start of operation of said video recording and reproducing apparatus;

wherein said first transfer means comprises:

a first memory;

a second memory storing a second reference waveform identical to the reference waveform generated by said reference inserting means;

means for generating first incremental address data as a function of time;

means for storing said first incremental address data into said first memory as a function of instantaneous amplitudes of said initial reference waveform and repeatedly reading the address data out of said first memory as a function instantaneous amplitudes of the reproduced first channel component for a first predetermined interval and applying the read address data to an address input of said second memory; and means for storing the first address data into said first memory as a function of instantaneous amplitudes of the reference waveform detected by said first detecting means immediately following the end of said first predetermined interval and repeatedly reading the first address data out of the first memory as a function of instantaneous amplitudes of the reproduced first channel component into said second memory to read the second reference waveform therefrom, and wherein said second transfer means comprises:

a third memory;

a fourth memory storing a third reference waveform identical to the reference waveform generated by said reference inserting means;

means for generating second incremental address data as a function of time;

means for storing said second incremental address data into said third memory as a function of instantaneous amplitudes of said initial reference waveform and repeatedly reading the address data out of said third memory into said fourth memory as a function of instantaneous amplitudes of the reproduced second channel component for a second predetermined interval to read the third reference waveform therefrom; and means for storing the second address data into said third memory as a function of instantaneous amplitudes of the reference waveform detected by said second detecting means immediately following the end of said second predetermined interval and repeatedly reading the second address data out of the third memory as a function of instantaneous amplitudes of the reproduced second channel component and applying the read address data to an address input of said fourth memory.

35. A video recording and reproducing apparatus as claimed in claim 34, wherein said initial reference waveform is identical to the reference waveform inserted to said first and second channel components of the video signal.

36. A signal processing circuit as claimed in claim 25, wherein said reference waveform inserted to each of the first and second channel components of the video signal is a ramp waveform, further comprising:

first delay means for introducing a time delay to the reference waveform detected by said first detecting means;

means for detecting the difference between the output of said first delay means and the reference waveform detected by said first detecting means and applying the reproduced first channel component to said channel recombination means instead of the output of said first transfer means when the detected difference is outside of a first predetermined range;

second delay means for introducing a time delay to the reference waveform detected by said second detecting means; and means for detecting the difference between the output of said second delay means and the reference waveform detected by said second detecting means and applying the reproduced second channel component to said channel recombination means instead of the output of said second transfer means when the detected difference is outside of a second predetermined range.

37. A video recording and reproducing apparatus as claimed in claim 25, further comprising means responsive to the start of operation of said apparatus for applying the first and second channel components to said channel recombination circuit means for a predetermined period of time instead of the outputs of said first and second transfer means.

* * * * *